US012683632B2

(12) United States Patent (10) Patent No.: US 12,683,632 B2
Pehlke (45) Date of Patent: Jul. 14, 2026

(54) SYSTEMS, DEVICES, AND METHODS RELATED TO RF FRONT-END ARCHITECTURES FOR ROAMING SUPPORT USING FILTER BANDWIDTH CONSOLIDATION AND REDUCED FILTER COUNT

(71) Applicant: SKYWORKS SOLUTIONS, INC., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 397 days.

(21) Appl. No.: 18/223,291

(22) Filed: Jul. 18, 2023

(65) Prior Publication Data

US 2024/0030945 A1 Jan. 25, 2024

Related U.S. Application Data

(60) Provisional application No. 63/390,627, filed on Jul. 19, 2022.

(51) Int. Cl.
*H04L 41/12* (2022.01)
*H04B 1/00* (2006.01)
*H04W 8/02* (2009.01)

(52) U.S. Cl.
CPC .............. *H04B 1/006* (2013.01); *H04W 8/02* (2013.01)

(58) Field of Classification Search
CPC ......... H04L 5/1461; H04B 1/006; H04B 1/48; H04B 1/50; H04B 1/001; H04B 1/1615; G01R 31/2608; G01R 31/2644
See application file for complete search history.

(56) References Cited

U.S. PATENT DOCUMENTS

2020/0395960 A1* 12/2020 Mori .................... H03H 9/0576
* cited by examiner

*Primary Examiner* — Phuoc H Doan
(74) *Attorney, Agent, or Firm* — Chang & Hale LLP

(57) ABSTRACT

A system may include a multiplexer coupled to an antenna. The system may further include a combined band filter circuit coupled to the multiplexer and including a filter having a modified filter bandpass extent to include a frequency range of a roaming band, the combined band filter circuit configured to couple a signal associated with the roaming band to the filter.

20 Claims, 8 Drawing Sheets

600

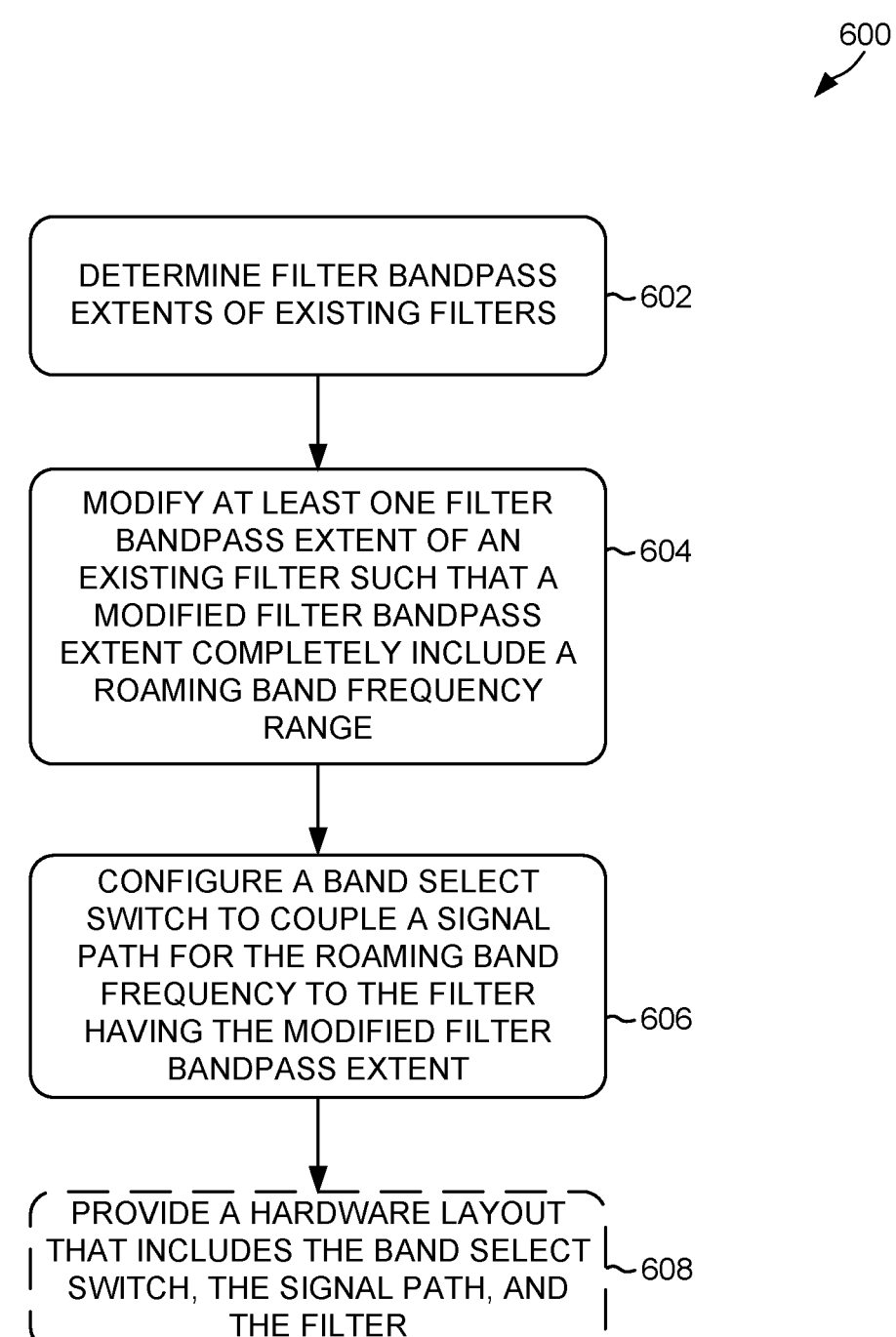

DETERMINE FILTER BANDPASS
EXTENTS OF EXISTING FILTERS ~602

MODIFY AT LEAST ONE FILTER
BANDPASS EXTENT OF AN
EXISTING FILTER SUCH THAT A
MODIFIED FILTER BANDPASS
EXTENT COMPLETELY INCLUDE A
ROAMING BAND FREQUENCY
RANGE ~604

CONFIGURE A BAND SELECT
SWITCH TO COUPLE A SIGNAL
PATH FOR THE ROAMING BAND
FREQUENCY TO THE FILTER
HAVING THE MODIFIED FILTER
BANDPASS EXTENT ~606

PROVIDE A HARDWARE LAYOUT
THAT INCLUDES THE BAND SELECT
SWITCH, THE SIGNAL PATH, AND
THE FILTER ~608

FIG. 6

RADIO-FREQUENCY DEVICE

LNA(S) ~ 812

808

FE MODULE(S)

810

820          802          806

PA

USER INTERFACE

BASEBAND SUB-SYSTEM

TRANSCEIVER

FILTER(S)          ANTENNA SWITCH 822          824

MEMORY

MULTIPLEXER

826

DUPLEXER ~ 828

818          804

POWER MANAGEMENT          BATTERY 814          816

SYSTEMS, DEVICES, AND METHODS RELATED TO RF FRONT-END ARCHITECTURES FOR ROAMING SUPPORT USING FILTER BANDWIDTH CONSOLIDATION AND REDUCED FILTER COUNT

CROSS-REFERENCE TO RELATED APPLICATION(S)

This application claims priority to U.S. Provisional Application No. 63/390,627 filed Jul. 19, 2022, entitled RF FRONT-END ARCHITECTURES FOR ROAMING SUPPORT USING FILTER BANDWIDTH CONSOLIDATION AND REDUCED FILTER COUNT, the disclosure of which is hereby expressly incorporated by reference herein in its entirety.

BACKGROUND

Field

The present disclosure relates to improving availability or usage of bandwidth for a roaming wireless device configured for use in multiple geographic regions.

Description of the Related Art

Wireless communication devices include many antennas, filters, switches, amplifiers, and other components arranged in a variety of configurations to provide support for different frequency bands. For example, a wireless communication device can include a first antenna and circuitry to support a first frequency band or set of frequency bands, a second antenna and circuitry to support a second frequency band or set of frequency bands, and so on. Typically, a geographic region has a set of frequency bands assigned for wireless communication within the geographic region. In many cases, wireless communication devices include separate antennas and/or circuitry to support frequency bands within the region. Conventional cellular radio-frequency (RF) front-end (FE) architectures include a large number of RF paths which are defined to be band specific based on fixed bandpass filter and duplexers in each fixed frequency path. Such configurations occupy substantial area on wireless communication devices, such as on front-end modules or other components of the devices.

In different regions of the world, different bands are defined and used. These regional bands often may overlap each other. With increasing reliance on wireless (especially cellular) communication and ever-increasing needs for remote working, manufacturers are finding it more important than ever to provide wireless communication devices that can maintain connectivity with regional bands used in different geographic regions. For instance, many wireless communication devices today provide roaming capabilities for connecting to service providers of different geographic regions. Traditionally, the roaming capabilities are supported by adding additional hardware paths for regional bands. However, adding separate paths for each geographic region can be costly and cumbersome for manufacturers who desire to maintain a simple, global design for their wireless communication devices.

SUMMARY

In some aspects, the techniques described herein relate to a system including: a multiplexer coupled to an antenna; and a combined band filter circuit coupled to the multiplexer and including a filter having a modified filter bandpass extent to include a frequency range of a roaming band, the combined band filter circuit configured to couple a signal associated with the roaming band to the filter.

In some aspects, the techniques described herein relate to a system wherein the combined band filter circuit further includes a second filter implemented in a ganged filter configuration with the filter and supports carrier aggregation of a first band associated with the filter and a second band associated with the second filter.

In some aspects, the techniques described herein relate to a system wherein the combined band filter circuit further includes a band select switch, the band select switch including a plurality of arms that are configured to be controlled simultaneously to support a receive signal path and a transmit signal path of the roaming band.

In some aspects, the techniques described herein relate to a system wherein the combined band filter circuit further includes a band select switch, the band select switch including a plurality of arms that are configured to be controlled simultaneously to implement a switch-combined configuration that simultaneously couples an input node to a plurality of output nodes.

In some aspects, the techniques described herein relate to a system wherein the switch-combined configuration combines signal paths from the plurality of output nodes at the input node and is configured to support carrier aggregation at the input node.

In some aspects, the techniques described herein relate to a system wherein the switch-combined configuration supports carrier aggregation of B2 signals and B66 signals.

In some aspects, the techniques described herein relate to a system wherein the modified filter bandpass extent passes B1 Tx signals and B2 Rx signals.

In some aspects, the techniques described herein relate to a system wherein the modified filter bandpass extent passes B3 Rx signals and B2 Tx signals.

In some aspects, the techniques described herein relate to a system wherein the modified filter bandpass extent passes B1 Rx signals and B66 Rx signals.

In some aspects, the techniques described herein relate to a system wherein the modified filter bandpass extent passes B3 Tx signals and B66 Tx signals.

In some aspects, the techniques described herein relate to a radio-frequency module including: a packaging substrate; a multiplexer implemented on the packaging substrate and coupled to at least one of a primary antenna or a diversity antenna; and a filter system implemented on the packaging substrate and coupled to the multiplexer, the filter system including a filter having a modified filter bandpass extent, the modified filter bandpass extent including a frequency range of a roaming band, the filter system configured to couple a signal associated with the roaming band to the filter.

In some aspects, the techniques described herein relate to a radio-frequency module wherein the filter system further includes a second filter implemented in a ganged filter configuration with the filter and supports carrier aggregation of a first band associated with the filter and a second band associated with the second filter.

In some aspects, the techniques described herein relate to a radio-frequency module wherein the filter system further includes a band select switch, the band select switch including a plurality of arms that are configured to be controlled simultaneously to support a receive signal path and a transmit signal path of the roaming band.

In some aspects, the techniques described herein relate to a radio-frequency module wherein the filter system further includes a band select switch, the band select switch including a plurality of arms that are configured to be controlled simultaneously to implement a switch-combined configuration that simultaneously couples an input node to a plurality of output nodes to support carrier aggregation at the input node.

In some aspects, the techniques described herein relate to a radio-frequency module wherein the modified filter bandpass extent passes B1 Tx signals and B2 Rx signals.

In some aspects, the techniques described herein relate to a radio-frequency module wherein the modified bandpass filter extent passes B3 Rx signals and B2 Tx signals.

In some aspects, the techniques described herein relate to a radio-frequency module wherein the modified bandpass filter extent passes B1 Rx signals and B66 Rx signals.

In some aspects, the techniques described herein relate to a radio-frequency module wherein the modified bandpass filter extent passes B3 Tx signals and B66 Tx signals.

In some aspects, the techniques described herein relate to a computer-implemented method including instructions that, when executed by a computing system, causes the computing system to perform steps including: determining, by the computing system, filter bandpass extents of existing filters; modifying, by the computing system, at least one filter bandpass extent of a filter such that a modified filter bandpass extent includes a roaming band frequency range; and configuring, by the computing system, a band select switch to couple a signal path for the roaming band frequency to the filter having the modified filter bandpass extent.

In some aspects, the techniques described herein relate to a computer-implemented method further including providing a hardware layout that includes the band select switch, the signal path, and the filter.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

4

FIG. 6 illustrates an example flow diagram of a process to modify filter bandpass extents for roaming bands in accordance with one or more embodiments.

Figure 7:
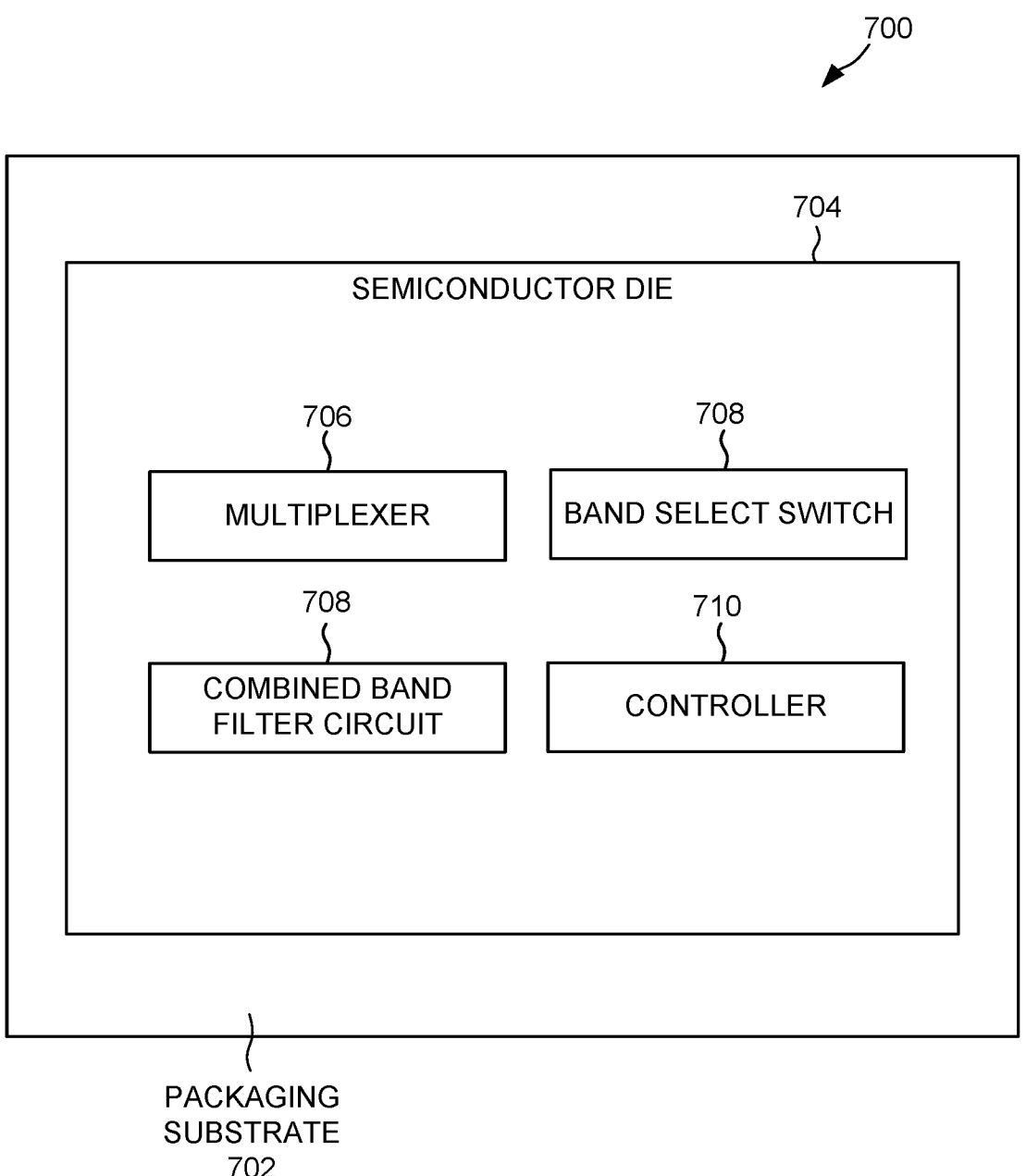

FIG. 7 illustrates an example radio-frequency module in accordance with one or more embodiments.

Figure 8:

FIG. 8 illustrates an example radio-frequency device in accordance with one or more embodiments.

DETAILED DESCRIPTION OF SOME EMBODIMENTS

Wireless communication devices include many antennas, filters, switches, amplifiers, and other components arranged in a variety of configurations to provide support for different frequency bands. For example, a wireless communication device can include a first antenna and circuitry to support a first frequency band or set of frequency bands, a second antenna and circuitry to support a second frequency band or set of frequency bands, and so on. Typically, a geographic region has a set of frequency bands assigned for wireless communication within the geographic region. In many cases, wireless communication devices include separate antennas and/or circuitry to support frequency bands within the region. Conventional cellular radio-frequency (RF) front-end (FE) architectures include a large number of RF paths which are defined to be band specific based on fixed bandpass filter and duplexers in each fixed frequency path. Such configurations occupy substantial area on wireless communication devices, such as on front-end modules or other components of the devices.

In different regions of the world, different bands are defined and used. These regional bands often may overlap each other. With increasing reliance on wireless (especially cellular) communication and ever-increasing needs for remote working, manufacturers are finding it more important than ever to provide wireless communication devices that can maintain connectivity with regional bands used in different geographic regions. For instance, many wireless communication devices today provide roaming capabilities for connecting to service providers of different geographic regions. Traditionally, the roaming capabilities are supported by adding additional hardware paths for regional bands. However, adding separate paths for each geographic region can be costly and cumbersome for manufacturers who desire to maintain a simple, global design for their wireless communication devices.

The present disclosure is directed to, in part, systems, devices, and techniques that modify filter bandpass extents (e.g., filter definitions) such that the filter frequency ranges of filters are extended. The present disclosure proposes a solution that can simplify circuits, reduce component count, and/or eliminate cost while expanding feature support beyond conventional configurations. As will be described in further detail with illustrations, for example, a wireless communication device may be designed to support Asia region, North America region, and South America region without any additional filter count while supporting carrier aggregation (CA) of some frequency bands.

In some embodiments, the systems and techniques are discussed herein in the context of some mid-range or mid-to-low-range bands including B1, B2, B3, and B66 bands for Long-Term Evolution (LTE) telecommunications networks. However, it is noted that the systems and techniques can be applied to a wide variety of bands and their frequencies for a variety of telecommunications networks.

Figure 1:
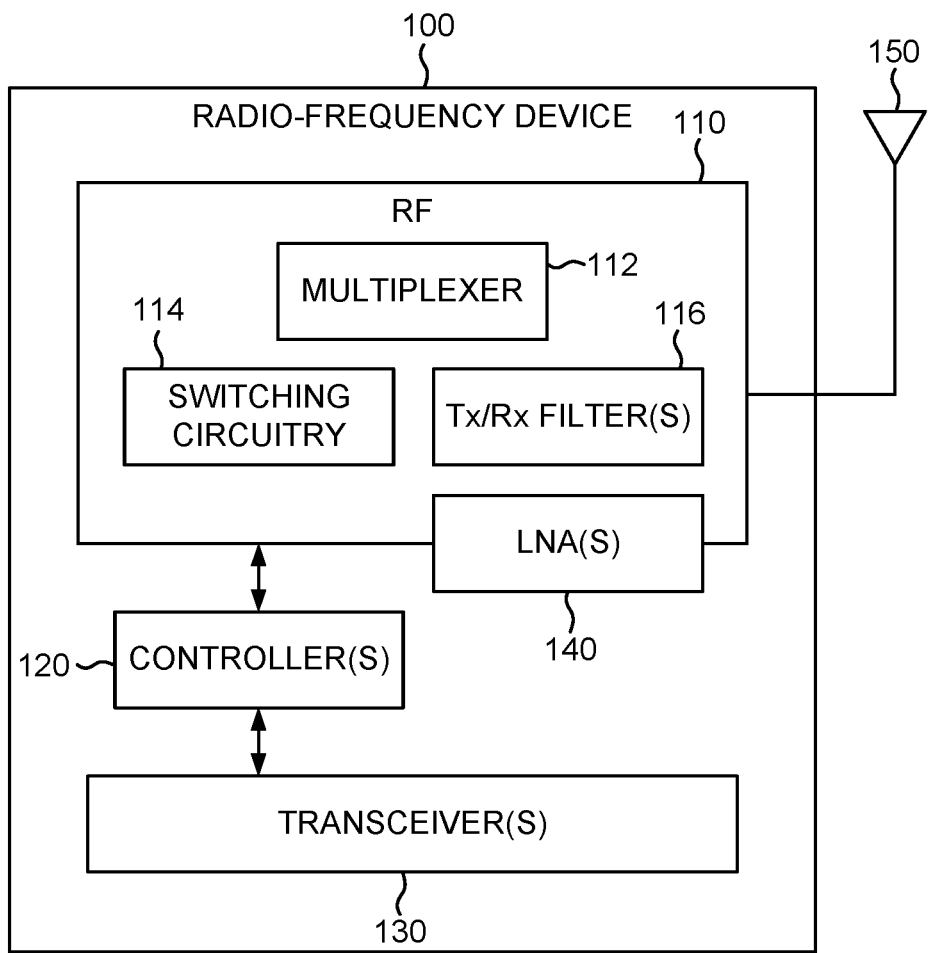
FIG. 1 illustrates an example radio-frequency device having various features relevant to certain aspects of the present disclosure in accordance with one or more embodiments.

FIG. 1 illustrates an example radio-frequency device 100 having various features relevant to certain aspects of the present disclosure in accordance with one or more embodiments. The radio-frequency device 100 includes an RF module 110, a transceiver(s) 130, a controller(s) 120, a low noise amplifier(s) (LNA(s)) 140, and an antenna(s) 150. The transceiver 130 can be configured to convert between analog signals and digital signals. The transceiver 130 can include a digital-to-analog converter, an analog-to-digital converter, a local oscillator for modulating or demodulating a baseband signal to or from a carrier frequency, a baseband processor that converts between digital samples and data bits (e.g., voice or other types of data), and/or other components. The RF module 110 can perform processing on a signal received from the antenna(s) 150 or received from the transceiver 130. In some embodiments, the RF module 110 can be referred to as a front-end module (FEM), which can be physically close to the antenna 150 (e.g., to reduce attenuation to cable loss). The controller 120 can communicate with the transceiver 130 and/or the RF module 110 to facilitate various functionality discussed herein. Although the controller 120 is illustrated as a separate component, in some embodiments the controller 120 can be a part of the RF module 110.

The RF module 110 can include a multiplexer(s) 112, switching circuitry 114, and/or a transmit/receive filter(s) 116 (Tx/Rx filter 116). In some embodiments, the RF module 110 includes the LNA(s) 140, while in other embodiments the LNA(s) 140 are implemented as a separate component outside the RF module 110, such as within another RF module or within another component. The multiplexer 112, the switching circuitry 114, the filter(s) 116, the LNA(s) 140, and/or other components discussed herein can be coupled to each other in a variety of manners, such as through a conductive path(s) that can include a cable, a trace, a wire, or any other conductive path/material. Although not illustrated in FIG. 1, the RF module 110 can also include other components, such as attenuators, matching circuits, duplexers, and so on.

The multiplexer 112 (also referred to as "the N-plexer 112") can be configured to implement multiplexing. The multiplexer 112 can include a diplexer, triplexer, quadplexer, or any N-plexer. In some examples of performing transmit operations, the multiplexer 112 can be configured to combine/merge a plurality of signals onto a common path or port (which can be connected to the antenna 150). Further, in some examples of performing receive operations, the multiplexer 112 can be configured to split/sort a signal from a common path or port (which can be connected to the antenna 150) into a plurality of signals. In some embodiments, each path or channel can be associated with a frequency band. The multiplexer 112 can include one or more filters, one or more switches, and/or other components. In one example implementation, the multiplexer 112 can include a low pass filter that passes frequencies associated with low-range frequency bands, a bandpass filter that passes frequencies associated with mid-range frequency bands, and a high pass filter that passes frequencies associated with high-range frequency bands. In another example implementation, the multiplexer 112 can be implemented as a diplexer that provides the functionality of a high pass filter and a low pass filter.

The filter(s) 116 can be configured to filter one or more signals. The filter(s) 116 can include multiple filters that are configured to support different frequency ranges (e.g., filter signals associated with different frequency bands). For example, the filter(s) 116 can include one or more Tx filters that are configured to support one or more transmit frequency bands and/or one or more Rx filters that are configured to support one or more receive frequency bands. In some examples of performing transmit operations, the filter(s) 116 can receive a signal from a power amplifier (PA) or other component, filter the signal, and output the filtered signal to the multiplexer 112. Further, in some examples of performing receive operations, the filter(s) 116 can receive a signal from the multiplexer 112, filter the signal, and output the filtered signal to the LNA(s) 140. In some embodiments, the filter(s) 116 includes one or more filters configured to support one more low-range bands (LB), one or more mid-to-low-range bands (MLB), one or more mid-to-high-range bands (MHB), one or more high-range bands (HB), one or ultra-high-range bands (UHB), and so on. Further, in some embodiments, the filter(s) 116 can be bandpass filters with modified filter bandpass extents such that filter frequency ranges of the filter(s) 116 are extended to cover multiple Tx and/or Rx frequency band ranges, as discussed in further detail below. In some embodiments, multiple filters 116 can be implemented in a ganged configuration and/or a switch combined configuration, as discussed in further detail below.

The switching circuitry 114 can include one or more switches or other circuitry configured to selectively route one or more signals between components of the RF module 110. A switch can include a transistor(s), a mechanical switch(s), or any other switch, and/or can include any number of throws/poles. In some embodiments, the switching circuitry 114 can include a switch (e.g., a band select switch) that is configured to receive a signal from the multiplexer 112 and selectively route the signal to a particular one of filters 116 that is associated with a particular frequency band. In some embodiments, the switching circuitry 114 includes a multi-arm-controlled switch that is configured to enable/disable multiple paths simultaneously, as discussed in further detail below. Additionally, or alternatively, in some embodiments, the switching circuitry 114 can include one or more switches that are configured to receive one or more signals from the filters 116 and selectively route a signal to one or more of LNAs 140.

The controller 120 can be configured to generate and/or send control signals to components of the radio-frequency device 100. For example, the controller 120 can send a control signal to the multiplexer 112 to control sorting or combining of signals, send a control signal to the switching circuitry 114 to route a signal (e.g., turn on or off a switch), send a control signal to the filter(s) 116 to enable/disable a filter, and so on. In some embodiments, the radio-frequency device 100 is configured to implement a plurality of gain modes for different amounts of amplification, and the controller 120 is configured to send a control signal to the RF module 110, the LNA(s) 140, and/or a PA to control a gain mode. Each gain mode can be associated with a different amount of amplification. For example, the controller 120 can provide a control signal indicative of a desired or targeted gain. In some embodiments, the controller 120 can include control circuitry configured to implement one or more of the operations discussed herein.

The antenna 150 can include one or more primary antennas and/or one or more diversity antennas. A primary antenna and a diversity antenna can be physically spaced apart such that a signal at the primary antenna and the diversity antenna are received with different characteristics. For example, a primary antenna and a diversity antenna can receive the signal with different attenuation, noise, frequency response, and/or phase shift. The transceiver 130 can use both of the signals with different characteristics to determine data bits corresponding to the signal. In some implementations, the transceiver 130 selects between a primary antenna and a diversity antenna based on the characteristics, such as selecting the antenna with the highest signal-to-noise ratio. In some embodiments, the transceiver 130 combines signals from a primary antenna and a diversity antenna to increase the signal-to-noise ratio of the combined signal. In some embodiments, the transceiver 130 processes signals to perform multiple-input/multiple-output (MIMO) communication. As noted above, in some embodiments, the diversity antenna can be physically spaced apart from the primary antenna. Here, the diversity antenna can be coupled to the transceiver 130 by a transmission line, such as a cable, a printed circuit board (PCB) trace, or another component. In examples, the transmission line is lossy and/or attenuates the signal received at the diversity antenna before it reaches the transceiver 130.

In some embodiments, the radio-frequency device 100 can implement a single antenna and/or a single antenna for each RF module. For example, the RF module 110 can be coupled to a single antenna and be configured to support one or more regional bands as well as one or more roaming bands in a combined manner. Here, the radio-frequency device 100 can implement a common antenna to support the one or more regional bands and the one or more roaming bands. By implementing a common antenna with a RF module that is configured to implement many frequency bands, including one or more roaming bands, the radio-frequency device 100 can utilize resources in an efficient manner, in comparison to other solutions that implement a separate antenna and/or RF module for roaming bands.

Further, in some embodiments, the radio-frequency device 100 can implement multiple RF modules and/or multiple antennas. In one example, the radio-frequency device 100 can include a first RF module that is coupled to a first antenna and that is configured to support one or more regional bands. Here, the radio-frequency device 100 can also include a second RF module that is coupled to a second antenna and that is configured to support one or more roaming bands. In another example, the radio-frequency device 100 implements multiple RF modules that are the same. For example, the radio-frequency device 100 can include a first RF module that supports one or more frequency bands and a second RF module that supports the same one or more frequency bands. In some cases, the first RF module can be located at a different location on the radio-frequency device 100 than the second RF module. Such diversity in location can allow the radio-frequency device 100 to switch between modules and/or antennas to achieve a desired performance characteristic (sometimes referred to as "antenna swapping").

Figure 2A:
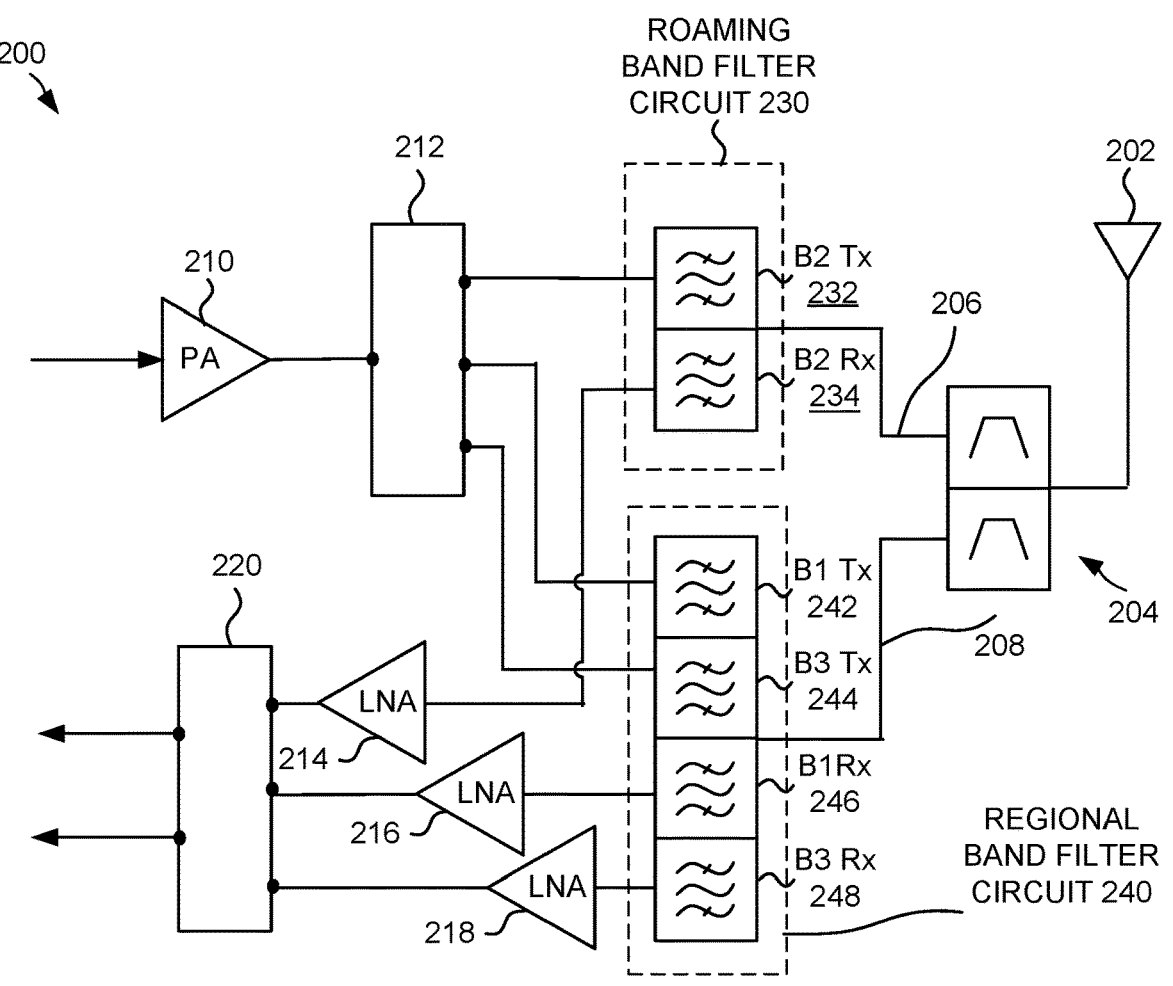
FIG. 2A illustrates an example conventional system that includes a regional band filter circuit and a roaming band filter circuit in accordance with one or more embodiments.

FIG. 2A illustrates an example conventional system 200 that includes a regional band filter circuit 240 and a roaming band filter circuit 230 in accordance with one or more embodiments. The system 200 receives and transmits one or more signals (e.g., the system 200 is implemented to perform one or more receive operations and one or more transmit operations).

The system 200 includes an antenna 202 coupled to a multiplexer 204. The antenna 202 includes a primary antenna, a diversity antenna, or any other antenna. The antenna 202 is configured to receive a signal and/or provide the signal to the multiplexer 204. The multiplexer 204 is configured to receive the signal from the antenna 202 and sort the signal into a plurality of signals that are associated with a plurality of frequency ranges, respectively. Based on band characteristic (e.g., frequency range) of the sorted signals, the sorted signals is provided to either the roaming band filter circuit 230 or the regional band filter circuit 240. For example, the multiplexer 204 includes: (i) a first filter that is configured to filter a first signal associated with one or more roaming frequency bands and (ii) a second filter that is configured to filter a second signal associated with one or more regional frequency bands.

In FIG. 2A, a roaming band "B2" is assumed. Further, regional bands are assumed to include "B1" and "B3". Non-limiting example bands and approximate frequency ranges are shown below in Table 1, which provide:

TABLE 1

| Band | Tx Frequency Range (MHz) | Rx Frequency Range (MHz) |
|------|--------------------------|--------------------------|
| B1 | 1,920-1,980 | 2,110-2,170 |
| B2 | 1,850-1,910 | 1,930-1,990 |
| B3 | 1,710-1,785 | 1,805-1,880 |
| B66 | 1,710-1,780 | 2110-2200 |

Although B1, B2, and B3 are assumed for the system 200, the assumption is for illustrative purpose only and other bands may be selected. Further, it is assumed that other frequency ranges than those shown below may be used.

For the purposes of description, it is assumed that the geographical regions of Asia requires use of bands B1 and B3 while the geographical regions of North and South Americas requires use of bands B2 and B66. As illustrated in a chart 250 of FIG. 2B, none of the bands B1 and B3 completely overlaps with the bands B2 or B66. Thus, for an Asia-device to be able to remain usable in North and South Americas, the device must provide roaming support for the bands B2 or B66. Continuing with FIG. 2A, the roaming band filter circuit 230 is coupled to the multiplexer 204. In this example, the roaming band filter circuit 230 includes a B2 Tx filter 232 and a B2 Rx filter 234 coupled to the multiplexer 204. The regional filter circuit 240 is also coupled to the multiplexer 204. The regional filter circuit 240 includes a B1 Tx filter 242, B3 Tx filter 244, B1 Rx filter 246, and B3 Rx filter 248.

In the conventional system 200, transmission signals can be amplified at a power amplifier 210, routed to a band-corresponding filter (e.g., one or more of Tx filters 232, 242, 244) at a band select switch 212, routed to the multiplexer 204, and transmitted at the antenna 202. On the other hand, received signals can be received at the antenna 202 and sorted at the multiplexer 204. Received roaming band signals are routed to B2 Rx filter 234 via a first signal path 206, routed to B2 LNA 214, and eventually routed to a transceiver through a switch 220. Received regional band signals are routed to the regional filter circuit 240 via a second signal path 208. The regional filter circuit 240 includes the B1 Tx filter 242, B3 Tx filter 244, B1 Rx filter 246, and B3 Rx filter 248. Typically, the filters have bandpass filter extents (e.g., filter definitions) that exactly (or substantially exactly) match frequency ranges of corresponding bands. The multiplexer 204 can route the sorted received signal to either the B1 Rx filter 246 or the B3 Rx filter 248, which routes then filtered signal to B1 LNA 216 or B3 LNA 218, respectively. The switch 220 can further route signals from the LNAs 214, 216, 218 to the transceiver.

Figure 2B:
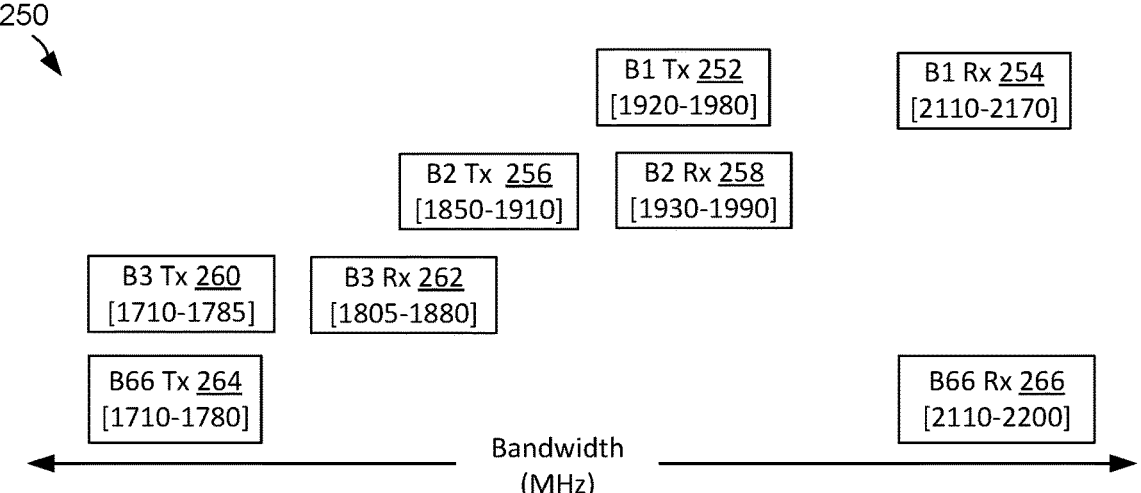
FIG. 2B illustrates a chart showing selected bands and their respective bandwidths in accordance with one or more embodiments.

FIG. 2B illustrates a chart 250 showing selected bands and their respective bandwidths in accordance with one or more embodiments. In the chart 250, X-axis represents bandwidth in megahertz (MHz). Each box 252, 254, 256, 258, 260, 262, 264, 266 represents a specified frequency range for transmit (Tx) or receive (Rx) operation for a band.

The chart 250 is for illustrative purposes only and size of the boxes may not be exactly to the scale.

In the chart 250, B2 Tx 256 does not completely overlap with frequency ranges of B1 Tx 252, B1 Rx 254, B3 Tx 260, B3 Rx 262, B66 Tx 264, and B66 Rx 266. A portion of B2 Rx 256 does not completely overlap with B1 Tx 252 (only overlaps over frequency range 1,930-1,980 but not 1,980-1,990) and, further, the frequency range is reserved for different signal directions. For instance, the frequency range is reserved for Tx operations for B1 Tx 252 while reserved for Rx operations for B2 Rx 258.

Supporting additional bands incur additional costs. Referring back to FIG. 2A, the system 200 needs to provide a separate set of filters in the roaming band filter circuit 230 (as shown) in order to support B2 roaming band. If the system 200 is to additionally provide roaming support for the B66 band, even more sets of Tx and Rx filters and signal paths (not shown) should be provided in the roaming band circuit 230. Accordingly, supporting additional roaming bands can require additional components (e.g., filters, signal traces, switches, or the like) that incur undesirably high cost for manufacturers.

Figure 3A:
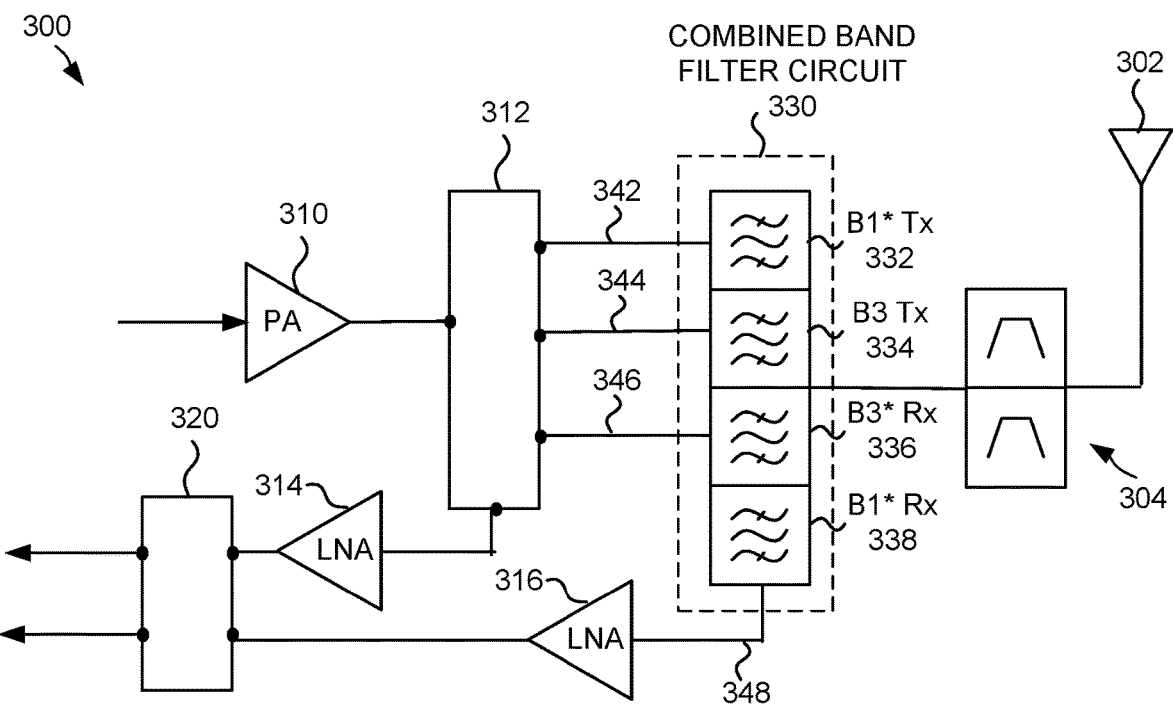
FIG. 3A illustrates an improved approach that proposes systems and methods that addresses these challenges.

Further, the system 200 faces challenge in ganging up filters (e.g., filters configured as a ganged filter 500 of FIG. 5) for better carrier aggregation. The system 200 may provide a discrete fixed passband duplexer for the B2 filters 232, 234 in the roaming band filter circuit 230 and a ganged filter for the B1, B3 filters 242, 244, 246, 248 in the regional filter circuit 240. The regional filter circuit 240 can support carrier aggregation for B1 and B3 bands as those bands do not overlap. However, as some but not all portions of B2 bands overlap with the B1 and B3 bands, it can be challenging to gang the filters in the roaming band filter circuit 230 and the regional filter circuit 240 without introducing undesirable impedance "suck-outs" and extremely high insertion loss issues (e.g., loss of an amount of energy that a signal loses as it travels along path). Thus, for the system 200, it can be challenging to support carrier aggregation with the roaming bands. FIG. 3A illustrates an improved approach that proposes systems and methods that addresses these challenges.

FIG. 3A illustrates an example improved system 300 that modifies filter bandpass extents and provides roaming capabilities with reduced number of components in accordance with one or more embodiments. The system 300 receives and transmits one or more signals (e.g., the system 300 is implemented to perform one or more receive operations and one or more transmit operations). In some embodiments, at least a portion of the system 300 can be implemented within a radio-frequency module or within a variety of components and/or devices.

The system 300 can include an antenna 302 coupled to a multiplexer 304. The antenna 302 can include a primary antenna, a diversity antenna, or any other antenna. The antenna 302 can be configured to receive a signal and/or provide the signal to the multiplexer 304. The multiplexer 304 can be configured to receive the signal from the antenna 302 and sort the signal into a plurality of signals that are associated with a plurality of frequency ranges, respectively. Based on band characteristic of the sorted signals, the sorted signals can be provided to a combined band filter circuit 330.

In the system 300, transmission signals can be amplified at a power amplifier 310, routed to a band select switch 312, routed to a band-corresponding filter of the combined filter circuit 330, routed to the multiplexer 304, and transmitted at the antenna 302. On the other hand, received signals can be received at the antenna 302, routed to and sorted at the multiplexer 304, routed to a band-corresponding filter of the combined filter circuit 330, routed to a first LNA 314 (through the band select switch 312) and/or a second LNA 316, routed to a switch 320, and received at a transceiver (not shown). Many variations are possible.

Like the example conventional system 200 of FIG. 2A, the example improved system 300 assumes a roaming band "B2" and regional bands "B1" and "B3". Although B1, B2, and B3 are assumed for the system 300, the assumption is for illustrative purpose only and the disclosures herein can be applied to other bands to provide various disclosed advantages. For the system 300, modified bandpass filter extents for previously presented Tx/Rx frequencies can be modified as shown below in Table 2:

TABLE 2

| Band | Tx Frequency Range (MHz) | Rx Frequency Range (MHz) |
|------|--------------------------|--------------------------|
| B1   | 1,920-1,990* (1,980)     | 2,110-2,200* (2,170)     |
| B2   | 1,850-1,910              | 1,930-1,990              |
| B3   | 1,710-1,785              | 1,805-1,910* (1,880)     |
| B66  | 1,710-1,780              | 2110-2200                |

In Table 2, modified bandpass filter extents are denoted with an asterisk (*) and original defined band frequencies are in parentheses. Here, the modified bandpass filter extents expand on corresponding band frequency ranges.

Figure 3B:
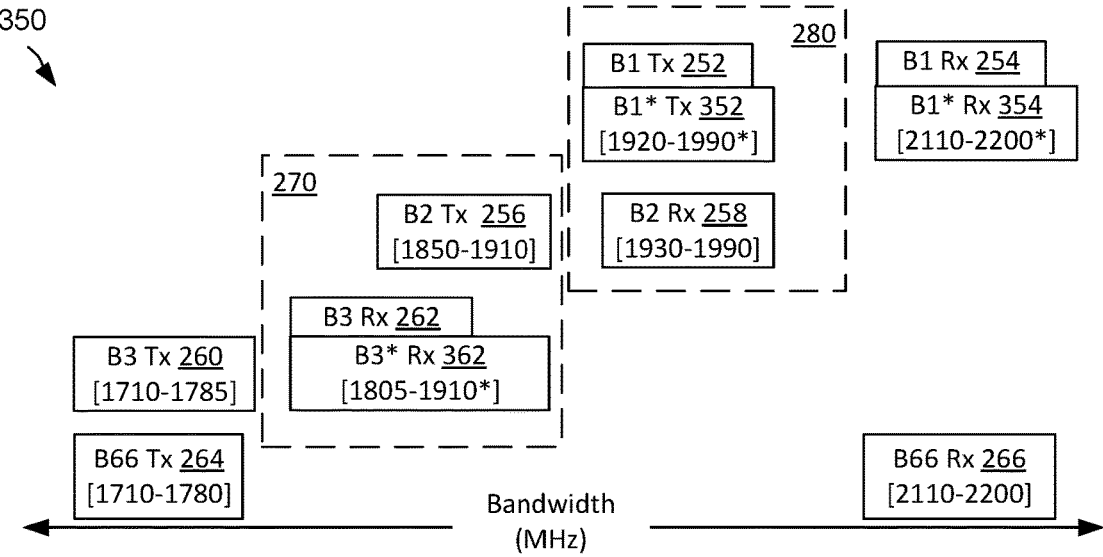
FIG. 3B illustrates a modified chart that visually illustrates modified bandpass filter extents in accordance with one or more embodiments.

FIG. 3B illustrates a modified chart 350 that visually illustrates modified bandpass filter extents in accordance with one or more embodiments. In the chart 350, X-axis represents bandwidth in megahertz (MHz) although different scale may be applicable to other implementations consistent with the present disclosure. Like the chart 250 of FIG. 2B, each box 252, 254, 256, 258, 260, 262, 264, 266 represents a defined frequency range for Tx or Rx operation for a band. Additionally, the chart 350 provides modified bandpass filter extents 352, 354, 362 that each correspond to the boxes 252, 254, 262, respectively, showing the modified filter extents of Table 2. Here, the modified B1* Tx 352 indicates expansion of filter bandpass extents on B1 Tx 252 of 1,920-1,980 to 1,920-1,990. The modified B1* Rx 354 indicates expansion of filter bandpass extents on B1 Rx 254 of 2,110-2,170 to 2,110-2,200. The modified B3* Rx 362 indicates expansion of filter bandpass extents on B3 Rx 262 of 1,805-1,880 to 1, 805-1,910. The chart 350 is for illustrative purpose only and size of the boxes may not be exactly to the scale.

Examining the chart 350, it is observed that the modified filter bandpass extent B1* Tx 352 completely includes the B2 Rx 258. Similarly, the modified filter bandpass extent B3* Rx 362 completely includes the B2 Tx 256. Regarding B66 band, which will be described in greater detail below, the modified filter bandpass extent B1* Rx 354 completely includes the B66 Rx 266. Thus, the modified B1 and B3 bandpass filter extents 352, 354, 362 can completely include the bands B2 and B66.

Referring back to FIG. 3A, the system 300 can provide the combined band filter circuit 330 that employs some or all of the modified filter bandpass extents 352, 354, 362. For instance, a first filter 332 can have bandpass characteristics of the modified filter bandpass extent B1* Tx 352, a second filter 334 can maintain bandpass characteristics for the B3 Tx 260, a third filter 336 can have bandpass characteristics of the modified filter bandpass extent B3* Rx 362, and a fourth filter 338 can have bandpass characteristics of the modified filter bandpass extent B1* Rx 354. In some embodiments, the filters 332, 334, 336, 338 can be a ganged filter (e.g., a ganged filter 500 of FIG. 5) that can support carrier aggregation.

The filters 332, 334, 336, 338 can be configured to filter receive signals as well as transmit signals. In contrast with the band select switch 212 of the example conventional system 200 in FIG. 2A that only routed transmission signals, the band select switch 312 of the example improved system 300 can additionally route received signals. The band select switch 312 can be a multi-arm-controlled switch (e.g., a multi-arm-controlled switch 400 of FIG. 4) that can include multiple arms, wherein two or more of the arms are configured to be simultaneously controlled. A first arm of the band select switch 312 can route transmission signals from the power amplifier 310 to the first filter 332, the second filter 334, and/or the third filter 336 through respective signal paths 342, 344, 346. A second arm of the band select switch 312 can route received signals from the first filter 332, the second filter 334, and/or the third filter 336 to the first LNA 314 respective signal paths 342, 344, 346. The multi-arm-controlled switch and its structure is described in greater detail with regard to FIG. 4. In some embodiments, some transmit or received signals can be directly routed to a signal path without being routed by the band select switch 312. For example, received signals for the fourth filter 338 can be routed directly to the second LNA 316.

With its band select switch 312 that can route both received and transmit signals, the improved system 300 can use one or more of the filters 332, 334, 336, 338 for both Tx and Rx operations. For instance, the band select switch 312 can be configured to deliver signals in B2 Tx 256 (having frequency range of 1,850-1,910) to the third filter 336 configured to filter signals within the modified bandpass filter extent B3* Rx 362 (having frequency range of 1,805-1,910). As block 270 of the chart 350 illustrates, the modified filter bandpass extent B3* Rx 362 includes the frequency range of B2 Tx 256 and, thus, the transmission signals in B2 Tx 256 can remain unaffected by the use of the third filter 336. In some embodiments, the band select switch 312 can be configured to receive signals from a selected filter. For instance, the band select switch 312 can be configured to receive signals in B2 Rx 258 (having frequency range of 1,930-1,990) from the first filter 332 configured to filter signals within the modified bandpass filter extent B1* Tx 352 (having frequency range of 1,920-1,990). As block 280 of the chart 350 illustrates, the modified filter bandpass extent B1* Tx 352 includes the frequency range of B2 Rx 258 and the received signals in B2 Rx 258 can remain unaffected by the use of the first filter 332.

The example improved system 300 can be configured to provide roaming support with reduced number of components. In the example conventional system 200, a total of six bandpass filters were needed to provide roaming support for B2 in addition to B1, B3 bands. In the example improved system 300, only four bandpass filters are needed to provide B1, B2, and B3 bands. More specifically, the first filter 332 can filter B1 Tx 252 and B2 Rx 258. The second filter 334 can filter B3 Tx. The third filter 336 can filter B2 Tx 256 and B3 Rx 262. The fourth filter 338 can filter B1 Rx 254. The reduction of the filter count and other connected circuitry can significantly reduce manufacturing cost in providing roaming support.

The roaming support with modified filter bandpass extents can be applied to other bands, such as B66. As the chart 350 illustrates, B66 Tx 264 having 1,710-1,780 MHz can readily be included in B3 Tx 260 having 1,710-1,785

MHz. Additionally, a modified filter extent B1* Rx having a frequency range of 2,110-2,200 MHz can include B66 Rx having 2,110-2,200 MHz. Here, with the modified filter bandpass extent B1* Rx 354, B66 roaming support can be obtained essentially free of manufacturing cost. In stark contrast, if the example conventional system 200 were to be redesigned to support B2 and B66 support, an entire quadplexer configured to support B2 Tx, B2 Rx, B66 Tx, and B66 Rx would be required. The example improved system 300 reduces component count and cost in other ways as well. As examples, the number of antenna switch module (ASM) switch throws can be reduced and an entire duplexer B2 can be eliminated. Further, carrier aggregation can be simplified with ganged filters. For instance, the modified filter bandpass extents do not overlap with one another. Accordingly, corresponding filters can be implemented as a combined filter (e.g., in a ganged configuration) to provide simplified carrier aggregation. Accordingly, the example improved system 300 can support carrier aggregation of B2 and B66 bands in approximately half the filter count and hardware component cost. It is noted that the fourth filter 338 is, with regard to B1, B2, B3, and B66 bands, used only for reception of signals (e.g., B1 Rx 254 and B66 Rx 266). Accordingly, the fourth filter 338 may not require a connection to the band select switch 312 but merely a connection to the switch 320, thereby reducing complexity of the band select switch 312.

Figure 4:
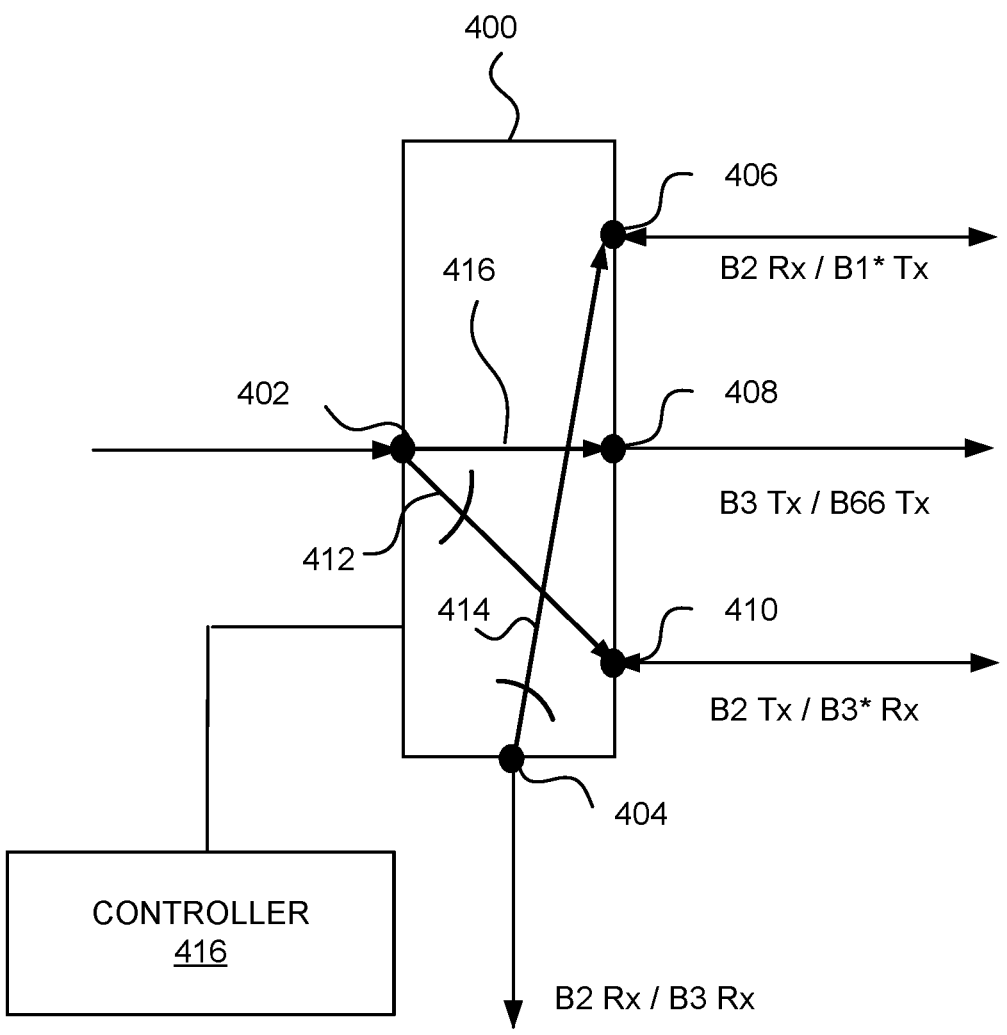
FIG. 4 illustrates an example multi-arm-controlled switch in accordance with one or more embodiments.

FIG. 4 illustrates an example multi-arm-controlled switch 400 in accordance with one or more embodiments. The multi-arm-controlled switch 400 can be configured to be implemented with multiple filters/components to arrange the filters/components in a switch-combined configuration (also referred to as a "flexibly switch-combined architecture"). The multi-arm-controlled switch 400 includes multiple arms, wherein two or more of the arms are configured to be simultaneously controlled. The multi-arm-controlled switch 400 includes a first arm 412, a second arm 414, and a third arm 416. The first arm 412 and the third arm 416 can be configured to connect an input node 402 (also referred to as a "pole") and multiple output nodes 406, 408, and 410 (also referred to as "throws"). It is noted that the output nodes 406 and 410 can simultaneously be configured as input nodes when used in signal reception. The second arm 414 can be configured to connect an output node 404 and multiple input nodes 406 and 410. The multiple arms 412, 414, 416 can be controlled by a control signal sent from a controller 416. The controller 416 can select nodes 406, 408, 410 for the arms 412, 414, 416 based on frequency band(s) of transmit or received signals. For example, the controller 416 can provide one or more control signals to the multi-arm-controlled switch 400 to connect the first arm 412 to the node 410, the second arm 414 to the node 406, and the third arm 416 to the node 408. In response to receiving the control signals, the multi-arm-controlled switch 400 can engage two arms of the multi-arm-controlled switch 400 (e.g., turn two arms to an ON state) to connect the node 402 of the first arm 412 to the node 406, the node 404 of the second arm 414 to the node 410, and the node 402 of the third arm 416 to the node 408, as illustrated in the example of FIG. 4. As such, the multi-arm-controlled switch 400 can be a flexibly configured switch that is able to simultaneously engage two or more arms to connect various combinations of components (e.g., filters) that can connect the nodes 402, 404 to the nodes 406, 408, and 410.

In some embodiments, a node may be shared by two or more arms. For example, the third arm 416 connect the node 402 to the node 408 in response to receiving a control signal.

As shown, the first arm 412 and the third arm 416 can connect the node 402 to, respectively, the nodes 410, 408 simultaneously. In other words, the multi-arm-controlled switch 400 can simultaneously join components to a common RF path. The simultaneous connection to the same input node or the same output node can be useful for carrier aggregation (CA). For example, the illustrated connections of the first arm 412 and the third arm 416 can aggregate two or more of B2 Tx 256, B3 Tx 260, and B66 Tx 264. Different pairings can provide different carrier aggregation (CA) pairings.

The multi-arm-controlled switch 400 is described in context of the example improved system 300 of FIG. 3A. The first arm 412 can connect a transmission signal from the power amplifier 310 to the first filter 332, the second filter 334, or the third filter 336. The first filter 332 has a filter bandpass extent (allows bandpass for a frequency range) of B1* Tx 352, the second filter 334 has a filter bandpass extent of B3 Tx 260, the third filter 336 has a filter bandpass extent of B3* Rx 362, which completely includes B2 Tx 256. As shown, the first arm 412 connects the node 402 and the node 410. Such connection can allow transmission of signals in B2 Tx 256 since the filter bandpass extent B3* Rx 362 completely includes B2 Tx 256. Further, as shown, the second arm 414 connects the node 404 and the node 406. Such connection can allow reception of signals in B2 Rx 256 since the filter bandpass extent B1* Tx 352 completely includes B2 Rx 256. Accordingly, the shown configuration can enable the improved system 300 to repurpose existing filters 332, 334, 336 to support roaming band B2 Tx/Rx. Various configurations that support different bands, roaming or otherwise, can be possible.

Additionally, as shown, the third arm 416 can connect the node 402 to the node 408 while the first arm 412 simultaneously connects the same node 402 to the node 410. Such connections can allow simultaneous signal transmission for B2 Tx 256 and B66 Tx 264 as reflected in the charts 250, 350 of FIGS. 2B and 3B, respectively. As the charts 250, 350 show, B2 Tx/Rx 256, 258 and B66 Tx/Rx 264, 266 do not overlap in frequency ranges and, thus, carrier aggregation techniques can be used for the B2 and B66 bands without the risk of impedance "suck-outs" and extremely high insertion loss.

In some embodiments, the multi-arm-controlled switch 400 is implemented with one or more transistors. A transistor can be implemented as a single device or multiple devices. A transistor can include a field-effect transistor (FET) (e.g., N-type or P-type device), such as a junction FET (JFET), insulated gate FET (e.g., a metal-oxide-semiconductor FET (MOSFET), a complementary metal-oxide-semiconductor (CMOS), etc.), and so on. Further, a transistor can include a Bipolar junction transistor (BJT) (e.g., an NPN transistor, a PNP transistor, etc.), such as a heterojunction bipolar transistors (HBT), etc. Alternatively, or additionally, in some embodiments, the multi-arm-controlled switch 400 is implemented with one or more mechanical switches or other types of switches.

Figure 5:
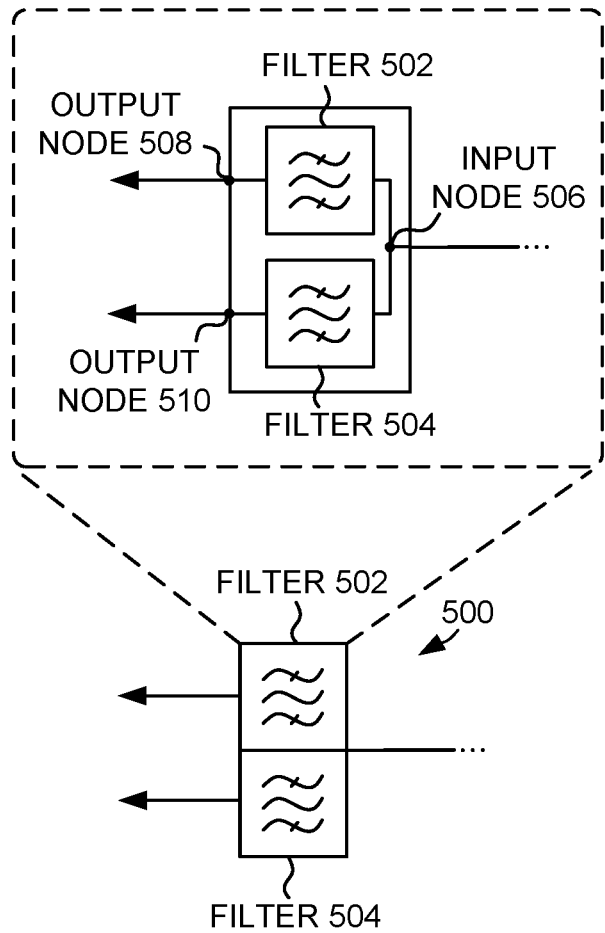
FIG. 5 illustrates example ganged filters in accordance with one or more embodiments.

FIG. 5 illustrates example ganged filters 500 in accordance with one or more embodiments. As illustrated, the ganged filters 500 includes a filter 502 combined with a filter 504 and configured to be associated with a same input node 506. That is, the filter 502 and the filter 504 are each coupled to the input node 506, which forms a common node. In such configuration, a signal that is provided to the input node 506 can be provided to the filter 502 and the filter 504. As also illustrated, the filter 502 is coupled to an output node 508 and configured to provide an output signal to the output node

508. Meanwhile, the filter 504 is coupled to the output node 510 and configured to provide an output signal to the output node 510. In some embodiments, a ganged configuration of filters can refer to the filters being permanently combined. Further, in some embodiments, a set of ganged filters can be referred to as a filter array.

FIG. 6 illustrates an example flow diagram of a process 600 to modify filter bandpass extents for roaming bands in accordance with one or more embodiments. The process 600 can be implemented by any of the components discussed herein, such as a controller, an RF module, or any component of a radio-frequency device. In some embodiments, the process 600 can be implemented at a computing device external to the radio-frequency device, such any computing system with a software that receives bands to be supported, determines modifiable filter bandpass extents, and provides a modified filter bandpass extents. The software can be further configured to provide a number of hardware components, a layout of the hardware components, and/or an expected cost of the layout.

At 602, filter bandpass extents (e.g., filter definitions) of existing filters can be determined. The filter band extents can closely follow known band frequency ranges of currently supported bands.

At 604, at least one filter bandpass extent of an existing filter can be modified such that a modified filter bandpass extent completely includes a roaming band frequency range. The roaming band frequency range can be a Tx frequency range, Rx frequency range, or both. For example, a filter bandpass extent of a B3 Rx filter can be modified to completely include a roaming band B2 Tx frequency range.

At 606, a band select switch can be configured to couple a signal path for the roaming band frequency to the filter having the modified filter bandpass extent. The band select switch can be a multi-arm-controlled switch as described in relation to FIG. 3A and FIG. 4. In some cases, a previously Rx-only signal path that supported an existing filter can be configured to additionally support a Tx signal path for the roaming signal at the existing filter. Continuing with the example above, a signal path that previously supported B3 Rx only can be configured to additionally support a B2 Tx signal path. Similarly, a previously Tx-only signal path can be configured to additionally support a Rx signal path.

At 608, optionally, a hardware layout that includes the band select switch, the signal path, and the filter can be provided. In some embodiments, a number of hardware components in the layout, an expected cost of the layout, an expected cost of implementing the layout, and/or other related information can be provided.

While the process 600 is described in context of providing support for a roaming band, it is to be understood that any band can be supported based on the present disclosure. In other words, where possible, the present disclosure and the various embodiments within can enable inclusion of any band(s) with modified filter bandpass extents of existing filters. Further, the process 600 can be implemented as a computer-implemented method.

FIG. 7 illustrates an example radio-frequency module 700 in accordance with one or more embodiments. The radio-frequency module 700 includes a packaging substrate 702, a semiconductor die 704 mounted on the packaging substrate 702, a multiplexer 706 implemented on the semiconductor die 704, a roaming band filter circuit 708 implemented on the semiconductor die 704, a band select switch 708 implemented on the semiconductor die 704, and a controller 712 implemented on the semiconductor die 704. The multiplexer 706 can include any of the multiplexers discussed herein, the combined band filter circuit 708 can include any of the combined band filter circuits discussed herein, the band select switch 708 can include any of the band select switches discussed herein, and/or the controller 712 can include any of the controllers discussed herein. Although the controller 712 is illustrated as being implemented on the semiconductor die 704 and the packaging substrate 702, the controller 712 can be implemented on a separate semiconductor die and/or packaging substrate. Similarly, the multiplexer 706, the combined band filter circuit 708, and the band select switch 708 can be implemented on separate semiconductor dies and/or packaging substrates.

FIG. 8 illustrates an example radio-frequency device 800 in accordance with one or more embodiments. As shown, the radio-frequency device 800 can include a baseband subsystem 802, a transceiver 804, a power amplifier (PA) module 806, one or more front-end (FE) modules 808, one or more antennas 810, one or more low noise amplifiers (LNAs) 812, a power management system 814, a battery 816, a memory 818, and a user interface 820. The baseband sub-system 802, the transceiver 804, the PA module 806, the one or more FE modules 808, the one or more antennas 810, the one or more LNAs 812, the power management system 814, the battery 816, the memory 818, and/or the user interface 820 can be in communication with each other.

The baseband sub-system 802 can be connected to the user interface 820 to facilitate various input and/or output of voice and/or data provided to and/or received from a user. The baseband sub-system 802 can also be connected to the memory 818 that is configured to store data and/or instructions to facilitate operation of the radio-frequency device 800 and/or to provide storage of information for a user.

The transceiver 804 can generate radio-frequency (RF) signals for transmission and/or process incoming RF signals received from the one or more LNAs 812, the one or more antennas 810, and/or the one or more FE modules 808. The transceiver 804 can interact with the baseband sub-system 802 that is configured to provide conversion between data and/or voice signals suitable for a user and/or RF signals suitable for the transceiver 804. The transceiver 804 can also be connected to the power management system 814.

The PA module 806 can include a plurality of PAs that can provide an amplified RF signal to the one or more antennas 810, such as via one or more components of the one or more FE modules 808. Although four paths are shown as inputs and outputs to the PA module 806, and any number of input and/output paths can be implemented.

The one or more FE modules 808 can include one or more filters 822, an antenna switch 824, a multiplexer 826, and/or a duplexer 828. The one or more filters 822 can include receive (Rx) filters and/or transmit (Tx) filters. In some embodiments, one or more of the one or more filters 822 are implemented as part of a combined band filter circuit, such as any of the combined band filter circuits discussed herein, which can include one or more switches for routing signals in some examples. The antenna switch 824 can route a signal to and/or from the one or more antennas 810, such as to and/or from other components of the one or more FE modules 808. The antenna switch 824 can include any number of poles and/or throws. In some embodiments, the antenna switch 824 is implemented as part of a module. The multiplexer 826 can be configured to implement multiplexing. The duplexer 828 can allow transmit and/or receive operations to be performed simultaneously using a common antenna. In some embodiments, the one or more FE modules 808 can route one or more received signals to the one or more LNAs 812, which can be configured to amplify the one or more received signals. In some embodiments, the packaged module 808 is implemented as a front-end module. Although the one or more LNAs 812 and the PA module 806 are illustrated as separate components from the one or more FE modules 808, in some embodiments the one or more LNAs 812 and/or the PA module 806 are part of the one or more FE modules 808.

The one or more antennas 810 can include antennas for transmitting and/or receiving signals associated with a wide variety of frequencies and communications standards. In examples, the one or more antennas 810 support Multiple-Input Multiple-output (MIMO) communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity can refer to communications in which a particular antenna is selected for operation at a particular time. For example, a switch can be used to select a particular antenna from a group of antennas based on a variety of factors, such as an observed bit error rate and/or a signal strength indicator. In examples, the one or more antennas 810 can include a diversity antenna.

The power management system 814 can be configured to manage power for operation of the radio-frequency device 800. The power management system 814 can provide power to any number of components of the radio-frequency device 800. The power management system 814 can receive a battery voltage from the battery 816. The battery 816 can be any suitable battery for use in the radio-frequency device 800, including, for example, a lithium-ion battery.

The radio-frequency device 800 can communicate using a wide variety of communications technologies, including, but not limited to, 2G, 3G, 4G (including Long Term Evolution (LTE), LTE-Advanced, and LTE-Advanced Pro), 5G, Wireless Local Area Network (WLAN) (for instance, Wi-Fi), Wireless Personal Area Network (WPAN) (for instance, Bluetooth and ZigBee), Wireless Metropolitan Area Network (WMAN) (for instance, WiMax), and/or satellite-based radio navigation systems (for instance, Global Positioning System (GPS) technologies).

The radio-frequency device 800 can operate with beamforming in certain implementations. For example, the radio-frequency device 800 can include phase shifters having variable phase controlled by the transceiver 804. Additionally, the phase shifters can be controlled to provide beam formation and directivity for transmission and/or reception of signals using the one or more antennas 810. For example, in the context of signal transmission, the phases of the transmit signals provided to the one or more antennas 810 are controlled such that radiated signals from the one or more antennas 810 combine using constructive and destructive interference to generate an aggregate transmit signal exhibiting beam-like qualities with more signal strength propagating in a given direction. In the context of signal reception, the phases are controlled such that more signal energy is received when the signal is arriving to the one or more antennas 810 from a particular direction. In some embodiments, the one or more antennas 810 include one or more arrays of antenna elements to enhance beamforming.

In some embodiments, the radio-frequency device 800 supports carrier aggregation, thereby providing flexibility to increase peak data rates. Carrier aggregation can be used for both Frequency Division Duplexing (FDD) and Time Division Duplexing (TDD) and can be used to aggregate a plurality of carriers or channels. Carrier aggregation includes contiguous aggregation, in which contiguous carriers within the same operating frequency band are aggregated. Carrier aggregation can also be non-contiguous and can include carriers separated in frequency within a common band or in different bands.

The radio-frequency device 800 can include a wide variety of devices that are configured to communicate wirelessly. For example, the radio-frequency device 800 can include a cellular phone, a smart-phone, a hand-held wireless device with or without phone functionality, a wireless tablet, a smart appliance, a smart vehicle, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wearable device (e.g., a watch), a clock, etc.

The detailed description is set forth with reference to the accompanying figures. In the figures, the left-most digit(s) of a reference number identifies the figure in which the reference number first appears. The use of the same reference numbers in different figures indicates similar or identical items.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled" can refer to two or more elements that may be either directly connected or connected by way of one or more intermediate elements. Components discussed herein can be coupled in a variety of manners, such as through a conductive material. Additionally, the words "herein," "above," "below," and words of similar import, when used in this disclosure, shall refer to this application as a whole and not to any particular portions of this application. Where the context permits, words in the above Description using the singular or plural number may also include the plural or singular number respectively.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks can be presented in a given order, alternative embodiments can perform routines having steps, or employ systems having blocks, in a different order, and some processes or blocks can be deleted, moved, added, subdivided, combined, and/or modified. Each of these processes or blocks can be implemented in a variety of different ways. Also, while processes or blocks are at times shown as being performed in series, these processes or blocks can instead be performed in parallel or can be performed at different times.

The features described herein can be applied to other systems, not necessarily the system described above. The elements and acts of the various embodiments described above can be combined to provide further embodiments.

In some embodiments, the methods and/or systems discussed herein can be implemented at least in part by control circuitry and/or memory. For example, memory can store executable instructions that, when executed by control circuitry, cause the control circuitry to perform operations discussed herein. To illustrate, in some embodiments of the process of FIG. 6, a device can include memory and control circuitry, wherein the memory can store executable instructions that, when executed by the control circuitry, cause the control circuitry to perform, at least in part, any of the operations of the process of FIG. 6. Additionally, or alternatively, other methods and/or systems discussed herein can be implemented at least in part with control circuitry and memory storing executable instructions.

Control circuitry can include one or more processors, such as one or more central processing units (CPUs), one or more microprocessors, one or more graphics processing units (GPUs), one or more digital signal processors (DSPs), and/or other processing circuitry. Alternatively, or additionally, control circuitry can include one or more application specific integrated circuits (ASIC), one or more field-programmable gate arrays (FPGAs), one or more program-specific standard products (ASSPs), one or more complex programmable logic devices (CPLDs), and/or the like. Control circuitry can be configured to execute one or more instructions stored in memory to thereby perform one or more operations to implement various functionality discussed herein.

Memory can include any suitable or desirable type of computer-readable media. For example, computer-readable media can include one or more volatile data storage devices, non-volatile data storage devices, removable data storage devices, and/or nonremovable data storage devices implemented using any technology, layout, and/or data structure (s)/protocol, including any suitable or desirable computer-readable instructions, data structures, program modules, or other types of data. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

While some embodiments have been described, these embodiments have been presented by way of example only, and are not intended to limit the scope of the disclosure. Indeed, the methods and systems described herein can be embodied in a variety of other forms; furthermore, various omissions, substitutions and changes in the form of the methods and systems described herein can be made without departing from the spirit of the disclosure. Claims and their equivalents are intended to cover such forms or modifications as would fall within the scope and spirit of the disclosure.

What is claimed is:

1. A system comprising:
   a multiplexer coupled to an antenna; and
   a combined band filter circuit coupled to the multiplexer, the combined band filter circuit including a first filter associated with a regional frequency band configured to operate in a first geographical area, the first filter having a modified filter bandpass extent from a frequency range associated with the regional frequency band to include a frequency range of a roaming frequency band configured to operate in a second geographical area, the combined band filter circuit configured to couple a signal associated with the roaming frequency band to the first filter, the first filter configured to process a transmit frequency range of the regional frequency band and to process a receive frequency range of the roaming frequency band, the modified filter bandpass extent of the first filter encompassing the receive frequency range of the roaming frequency band.

2. The system of claim 1 wherein the combined band filter circuit further includes a second filter implemented in a ganged filter configuration with the first filter and supports carrier aggregation of a first band associated with the first filter and a second band associated with the second filter.

3. The system of claim 1 wherein the combined band filter circuit further includes a band select switch, the band select switch including a plurality of arms that are configured to be controlled simultaneously to support a receive signal path and a transmit signal path of the roaming frequency band.

4. The system of claim 1 wherein the combined band filter circuit further includes a band select switch, the band select switch including a plurality of arms that are configured to be controlled simultaneously to implement a switch-combined configuration that simultaneously couples an input node to a plurality of output nodes.

5. The system of claim 4 wherein the switch-combined configuration combines signal paths from the plurality of output nodes at the input node and is configured to support carrier aggregation at the input node.

6. The system of claim 5 wherein the switch-combined configuration supports carrier aggregation of B2 signals and B66 signals.

7. The system of claim 1 wherein the modified filter bandpass extent passes B1 Tx signals and B2 Rx signals.

8. The system of claim 1 wherein the modified filter bandpass extent passes B3 Rx signals and B2 Tx signals.

9. The system of claim 1 wherein the modified filter bandpass extent passes B1 Rx signals and B66 Rx signals.

10. The system of claim 1 wherein the modified filter bandpass extent passes B3 Tx signals and B66 Tx signals.

11. A radio-frequency module comprising:
a packaging substrate;
a multiplexer implemented on the packaging substrate and coupled to at least one of a primary antenna or a diversity antenna; and
a filter system implemented on the packaging substrate and coupled to the multiplexer, the filter system including a first filter associated with a regional frequency band configured to operate in a first geographical area, the first filter having a modified filter bandpass extent from a frequency range associated with the regional frequency band, the modified filter bandpass extent including a frequency range of a roaming frequency band configured to operate in a second geographical area, the filter system configured to couple a signal associated with the roaming frequency band to the first filter, the first filter configured to process a transmit frequency range of the regional frequency band and to process a receive frequency range of the roaming frequency band, the modified filter bandpass extent of the first filter encompassing the receive frequency range of the roaming frequency band.

12. The radio-frequency module of claim 11 wherein the filter system further includes a second filter implemented in a ganged filter configuration with the first filter and supports carrier aggregation of a first band associated with the first filter and a second band associated with the second filter.

13. The radio-frequency module of claim 11 wherein the filter system further includes a band select switch, the band select switch including a plurality of arms that are configured to be controlled simultaneously to support a receive signal path and a transmit signal path of the roaming frequency band.

14. The radio-frequency module of claim 11 wherein the filter system further includes a band select switch, the band select switch including a plurality of arms that are configured to be controlled simultaneously to implement a switch-combined configuration that simultaneously couples an input node to a plurality of output nodes to support carrier aggregation at the input node.

15. The radio-frequency module of claim 11 wherein the modified filter bandpass extent passes B1 Tx signals and B2 Rx signals.

16. The radio-frequency module of claim 11 wherein the modified filter bandpass extent passes B3 Rx signals and B2 Tx signals.

17. The radio-frequency module of claim 11 wherein the modified filter bandpass extent passes B1 Rx signals and B66 Rx signals.

18. The radio-frequency module of claim 11 wherein the modified filter bandpass extent passes B3 Tx signals and B66 Tx signals.

19. A computer-implemented method comprising instructions that, when executed by a computing system, cause the computing system to perform steps comprising:
determining, by the computing system, filter bandpass extents of existing filters;
modifying, by the computing system, at least one filter bandpass extent of a first filter associated with a regional frequency band configured to operate in a first geographical area such that a modified filter bandpass extent is extended from a frequency range associated with the regional frequency band and includes a frequency range of a roaming frequency band configured to operate in a second geographical area, the first filter configured to process a transmit frequency range of the regional frequency band and to process a receive frequency range of the roaming frequency band, the modified filter bandpass extent of the first filter encompassing the receive frequency range of the roaming frequency band; and
configuring, by the computing system, a band select switch to couple a signal path for the roaming frequency band to the first filter having the modified filter bandpass extent.

20. The computer-implemented method of claim 19 further comprising providing a hardware layout that includes the band select switch, the signal path, and the first filter.

* * * * *